US006868182B2

(12) United States Patent
Kasutani

(10) Patent No.: US 6,868,182 B2
(45) Date of Patent: Mar. 15, 2005

(54) PICTURE FEATURE EXTRACTION DEVICE, PICTURE RETRIEVING DEVICE, AND METHODS THEREOF FOR PICTURE FEATURE EXTRACTION AND RETRIEVING PICTURE

(75) Inventor: Eiji Kasutani, Tokyo (JP)

(73) Assignee: NEC Corporation, Tokyo (JP)

( * ) Notice: Subject to any disclaimer, the term of this patent is extended or adjusted under 35 U.S.C. 154(b) by 163 days.

(21) Appl. No.: 10/370,563

(22) Filed: Feb. 24, 2003

(65) Prior Publication Data

US 2003/0123735 A1 Jul. 3, 2003

Related U.S. Application Data

(62) Division of application No. 09/477,088, filed on Jan. 3, 2000.

(30) Foreign Application Priority Data

Jan. 6, 1999 (JP) .......................................... 11-001507
Mar. 5, 1999 (JP) .......................................... 11-059432

(51) Int. Cl.⁷ ............................. G06K 9/46; G06K 9/66
(52) U.S. Cl. ........................ 382/190; 382/272; 382/305
(58) Field of Search ............................... 382/162, 166, 382/190, 195, 236, 250, 272, 278, 298, 305; 348/421.1

(56) References Cited

U.S. PATENT DOCUMENTS

| 5,046,121 | A |   | 9/1991 | Yonekawa et al. |         |
|-----------|---|---|--------|-----------------|---------|
| 5,101,441 | A |   | 3/1992 | Yamaguchi       |         |
| 5,724,579 | A |   | 3/1998 | Suzuki          |         |
| 5,805,746 | A |   | 9/1998 | Miyatake et al. |         |
| 5,892,847 | A | * | 4/1999 | Johnson         | 382/232 |
| 5,949,904 | A | * | 9/1999 | Delp            | 382/250 |
| 6,687,411 | B1 | * | 2/2004 | Miura et al.    | 382/250 |

FOREIGN PATENT DOCUMENTS

| JP | 61-201373 | 9/1986  |
|----|-----------|---------|
| JP | 4-333991  | 11/1992 |
| JP | 6-231254  | 8/1994  |
| JP | 8-249349  | 9/1996  |

OTHER PUBLICATIONS

Yeo et al., "On The Extraction of DC Sequence From MPEG Compressed Video", IEEE International Conference on Image Processing, pp. 260–263 (1995).

(List continued on next page.)

*Primary Examiner*—Phuoc Tran
(74) *Attorney, Agent, or Firm*—Dickstein, Shapiro, Morin & Oshinsky LLP

(57) ABSTRACT

In a picture feature extraction device, picture data having been determined as a moving picture by a picture data identifying section is subjected to being taken out the data corresponding to the entire frames or a part of the frames by a feature data extracting frame selecting means, upon which a resized picture generating means generates a resized picture from the data of each frame, and a frequency analyzing means analyzes a frequency of the resized picture having been generated. Then a DC component/partial AC component extracting means takes out DC components and a part of AC components, after which a feature extraction means generates feature data of the whole frames having been selected. The picture data identified as still picture data is subjected to having a resized picture generated by the resized picture generating means from the data of each frame, after which the frequency analyzing means executes a frequency analysis on the resized picture having being generated. Then as the DC component/partial AC component extracting means takes out DC components and a part of AC components obtained as a result of the analysis in order to generate a feature data.

35 Claims, 10 Drawing Sheets

OTHER PUBLICATIONS

Ariki et al., "Face Indexing on Video Data–Extraction, Recognition, Tracking and Modeling," Dept. of Electronics and Informatics, Ryukoku Univiersity, Seta, Otsu–shi, Japan, Third IEEE International Conference on Nara, Japan, pp. 62–69 (Los Alamitos, CA, U.S.A., Apr. 1998).

Kobla et al., Journal of Electronic Imaging, vol., 7, pp. 294–307 (1998).

Bae et al., "Image Retrieval Using Texture Based on DCT," Information, Communications and Signal Processing, Proceedings of 1997 International Conference on Singapore, pp. 1065–1068 (New York, New York,, U.S.A. Sep. 1997).

Kasutani et al, "Video Scene Retrieval Method Based on Extracting Significant Parameters in Compressed Video," NTG Fachberichte, VDE Verlag, Berlin, Germany, pp. 579–584 (Sep. 1997).

Abstract of Kasutani et al., "Proposal of Rapid Detection and Retrieval Using Parameters in Compressed Video", Dept. of Electronics and Communication Engineering, WASEDA University, pp. 25–32 (1997).

Copy of Japanese Office Action dated Feb. 25, 2003 (and English translation of relevant portion).

* cited by examiner

F I G. 6
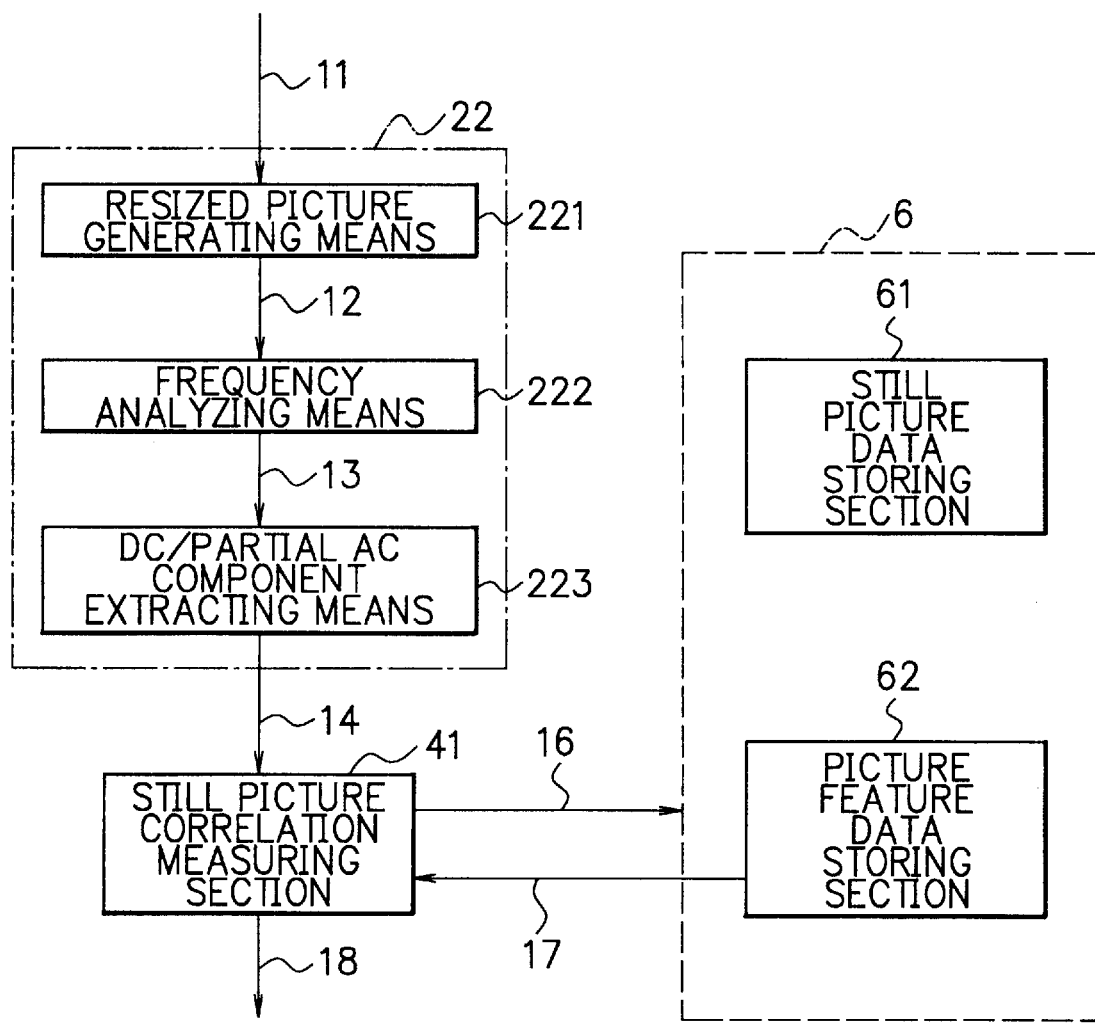

F I G. 7
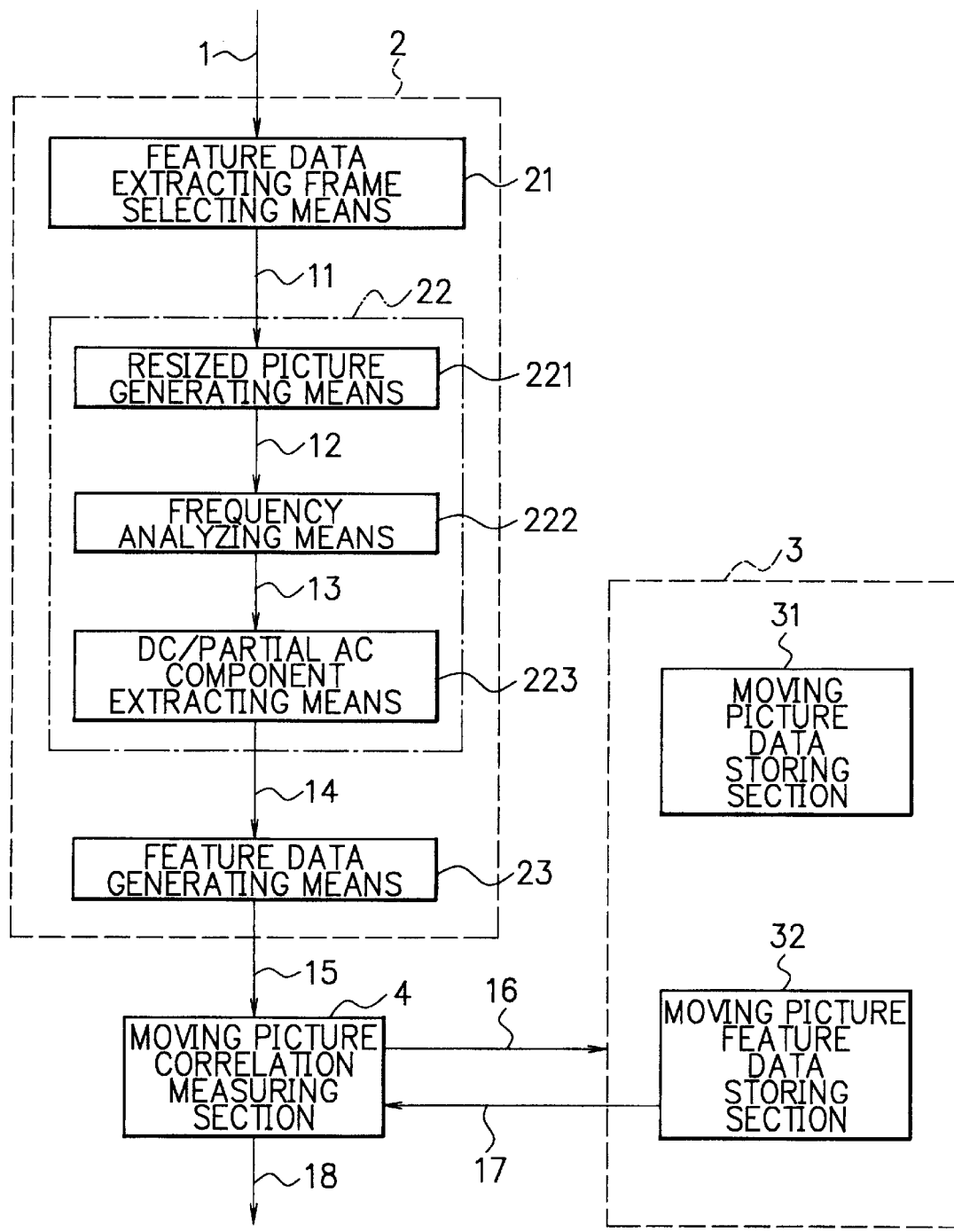

F I G. 10

|  | 8x8 GRID+DCT | 2x2 GRID | 3x3 GRID | 4x4 GRID |
|---|---|---|---|---|
| RETRIEVAL RATE | 0.868 | 0.739 | 0.783 | 0.783 |
| BYTE/PICTURE | 12 | 12 | 27 | 48 |

PICTURE FEATURE EXTRACTION DEVICE, PICTURE RETRIEVING DEVICE, AND METHODS THEREOF FOR PICTURE FEATURE EXTRACTION AND RETRIEVING PICTURE

This is a divisional of U.S. patent application Ser. No. 09/477,088, filed Jan. 3, 2000.

BACKGROUND OF THE INVENTION

The present invention relates to a picture feature extraction device, picture retrieving device, as well as a method of picture feature extraction, and a method of retrieving pictures.

DESCRIPTION OF THE RELATED ART

As to the conventional picture feature extraction device, picture retrieving device and methods thereof, it is typical that they are used in retrieving similar pictures or sections of moving pictures from the pictures being stored.

Still picture has been often described using color feature. Both a color histogram and dominant colors are typically used as picture feature data for retrieval. Layout is also a useful feature and can be represented using the combination of grid structure, which divides a still picture into blocks and uses a color histogram and local dominant colors for each block. One example of a prior art picture retrieving method using a reference picture is disclosed in Japanese Patent Laid-Open Publication No. 8-249349. In accordance with the disclosed retrieving method, the method divides a still picture into blocks and uses dominant colors of each block as feature data. However, as they need a relatively large number of bits for their representation, the similarity evaluation process requires a large amount of calculation. Therefore, this kind of combination is not very suitable especially for video segment retrieval, which requests many repetition of similarity calculation. One example of a prior art video segment retrieval method is disclosed in U.S. Pat. No. 5,805,746. The disclosed retrieving method reduces the calculation cost using the combination of grid structure and local average colors for high speed detection of only long and identical video segment, like TV commercials. As this description represents the color layout roughly, this method cannot retrieve still picture and short sections with sufficient accuracy.

The following problems are recognized in the above-mentioned prior art methods.

First, in the conventional methods, the feature data becomes large, and therefore, it requires a large-scale storage unit for storing the feature data. Second, a speed required in retrieving decreases because the feature data is large. Third, since the matching is conducted between the entire inputted moving picture feature data and each point of time of the moving picture data within the data base subjected to retrieval, the time to be consumed for the matching process becomes enormous. Particularly, it is a notable problem that the data base becomes larger in scale. Fourth, if the feature data represents the color layout of pictures roughly, still pictures and short sections cannot be retrieved with sufficient accuracy.

SUMMARY OF THE INVENTION

It is therefore an object of the present invention to provide a picture feature extraction device, picture retrieving device, and methods thereof for generating picture feature data and retrieving pictures, respectively, capable of retrieving similar still and moving pictures from still and moving picture data precisely and at high speed, so as to generate still picture feature data and moving picture feature data requiring less memory capacity.

In accordance with a first aspect of the present invention, there is provided a picture feature extraction device comprising: a resized picture generating means generating a resized picture from still picture data; a frequency analyzing means executing a frequency analysis on said resized picture having been generated by said resized picture generating means; and a DC/partial AC component extracting means taking out DC components and a part of AC components obtained as a result of the analysis by said frequency analyzing means as a picture feature data.

In accordance with a second aspect of the present invention, there is provided a picture feature extraction device comprising: a still picture data base including a still picture data storing means storing said still picture data, and a still picture feature data storing means storing said still picture feature data generated for each still picture data stored in said still picture data storing means.

In accordance with a third aspect of the present invention, there is provided a picture feature extraction device comprising: a feature data extracting frame selecting means taking out some data corresponding to the entire frames or a portion of the frames from the moving picture data, selecting the data subjected to processing; a resized picture generating means generating a resized picture from data corresponding to each frame having been taken out; a frequency analyzing means executing a frequency analysis on said resized picture having been generated by said resized picture generating means; a DC/partial AC component extracting means taking out DC components and a part of AC components obtained as a result of the analysis by said frequency analyzing means as a frame feature data; and a moving picture feature data producing means producing a moving picture feature data by collecting said frame feature data outputted from said DC/partial AC component extracting means.

In accordance with a fourth aspect of the present invention, there is provided a picture feature extraction device comprising: a moving picture data base including a moving picture data storing means storing said moving picture data, and a moving picture feature data storing means storing said moving picture feature data generated for each moving picture data stored in said moving picture data storing means.

In accordance with a fifth aspect of the present invention, there is provided a picture feature extraction device comprising: a picture data identifying means identifying whether the inputted picture data is of still pictures or of moving pictures; a still picture feature extraction means including a resized picture generating means generating a resized picture from the picture data identified as still picture data by said picture data identifying means, a frequency analyzing means executing a frequency analysis on said resized picture having been generated by said resized picture generating means, and a DC/partial AC component extracting means taking out DC components and a part of AC components obtained as a result of the analysis by said frequency analyzing means as a still picture feature data; and a moving picture feature extraction means including a feature data extracting frame selecting means taking out some data corresponding to the entire frames or a portion of the frames from the picture data identified as moving picture data by said picture data identifying means, selecting the data subjected to processing, a resized picture generating means generating a resized picture from data corresponding to each frame having been taken out, a frequency analyzing means executing a frequency analysis on said resized picture having been generated, a DC/partial AC component extracting means taking out DC components and a part of AC components obtained as a result of the analysis by said frequency analyzing means as a frame feature data, and a moving picture feature data producing means generating a moving picture feature data by collecting said frame feature data outputted from said DC/partial AC component extracting means.

In accordance with a sixth aspect of the present invention, there is provided a picture feature extraction device comprising: a picture data base including a picture data storing means storing said picture data, and a picture feature data storing means using each picture data stored in said picture data storing means for storing the still picture feature data generated by said still picture feature extraction means and the moving picture feature data generated by said moving picture feature extraction means as a picture feature data.

In accordance with a seventh aspect of the present invention, there is provided a picture feature extraction device wherein said resized picture generating means divides a still picture into blocks, and takes out color data representative of each block from each block.

In accordance with an eighth aspect of the present invention, there is provided a picture feature extraction device wherein in case when said picture data is compressed by blocks, said resized picture generating means takes out DC components from each block.

In accordance with a ninth aspect of the present invention, there is provided a picture retrieving device comprising: a still picture generating means including a resized picture generating means generating a resized picture from still picture data, a frequency analyzing means executing a frequency analysis on said resized picture having been generated by said resized picture generating means, and a DC/partial AC component extracting means taking out DC components and a part of AC components obtained as a result of the analysis by said frequency analyzing means as a picture feature data; a still picture data base including a still picture feature data storing means storing the still picture feature data previously being generated by said still picture feature extraction means on the basis of the still picture data, and a still picture data storing means storing said still picture data; and a still picture feature data correlation measuring means calculating a correlation value between the still picture feature data generated by said still picture feature extraction means on the basis of the inputted still picture data and the still picture feature data stored in said still picture data base, the still picture feature data correlation measuring means retrieving the still picture within the still picture data base having a high correlation value as a candidate of similar still picture.

In accordance with a tenth aspect of the present invention, there is provided a picture retrieving device comprising: a moving picture feature extraction means including a feature data extracting frame selecting means taking out some data corresponding to the entire frames or a portion of the frames from the moving picture data, selecting the data subjected to processing, a resized picture generating means generating a resized picture from data corresponding to each frame having been taken out, a frequency analyzing means executing a frequency analysis on said resized picture having been generated by said resized picture generating means, a DC/partial AC component extracting means taking out DC components and a part of AC components obtained as a result of the analysis by said frequency analyzing means as a frame feature data, and a moving picture feature data producing means producing a moving picture feature data by collecting said frame feature data outputted from said DC/partial AC component extracting means; a moving picture data base including a moving picture feature data storing means storing the moving picture feature data previously being generated by said moving picture feature extraction means on the basis of the moving picture data, and a moving picture data storing means storing said moving picture data; and a moving picture feature data correlation measuring means calculating a correlation value between the moving picture feature data generated by said moving picture feature extraction means on the basis of the inputted moving picture data and the moving picture feature data stored in said moving picture data base, the moving picture feature data correlation measuring means retrieving the moving picture segment within the moving picture data base having a high correlation value as a candidate of similar moving picture segment.

In accordance with an eleventh aspect of the present invention, there is provided a picture retrieving device comprising: a picture data identifying means identifying whether the inputted picture data is of still pictures or of moving pictures; a still picture feature extraction means including a resized picture generating means generating a resized picture from the picture data identified as still picture data by said picture data identifying means, a frequency analyzing means executing a frequency analysis on said resized picture having been generated by said resized picture generating means, and a DC/partial AC component extracting means taking out DC components and a part of AC components obtained as a result of the analysis by said frequency analyzing means as a still picture feature data; a moving picture feature extraction means including a feature data extracting frame selecting means taking out some data corresponding to the entire frames or a portion of the frames from the picture data identified as moving picture data by said picture data identifying means, selecting the data subjected to processing, a resized picture generating means generating a resized picture from data corresponding to each frame having been taken out, a frequency analyzing means executing a frequency analysis on said resized picture having been generated by said resized picture generating means, a DC/partial AC component extracting means taking out DC components and a part of AC components obtained as a result of the analysis by said frequency analyzing means as a frame feature data, and a moving picture feature data producing means generating a moving picture feature data by collecting said frame feature data outputted from said DC/partial AC component extracting means; a picture data base including a picture feature data storing means storing the still picture feature data previously being generated by said still picture feature extraction means on the basis of the still picture data and the moving picture feature data previously being generated by said moving picture feature extraction means on the basis of the moving picture data, and a picture data storing means storing said still picture data and said moving picture data; a still picture feature data correlation measuring means calculating a correlation value between the still picture feature data generated by said still picture feature extraction means on the basis of the inputted still picture data and the picture feature data stored in said picture data base; and a moving picture feature data correlation measuring means calculating a correlation value between the moving picture feature data generated by said moving picture feature extraction means on the basis of the inputted moving picture data and the picture feature data stored in said picture data base, said still picture feature data correlation measuring means retrieving the still picture within the picture data base having a high correlation value as a candidate of similar still picture, said moving picture feature data correlation measuring means retrieving the moving picture segment within the picture data base having a high correlation value as a candidate of similar moving picture segment.

In accordance with a twelfth aspect of the present invention, there is provided a picture retrieving device wherein said moving picture feature data correlation measuring means divides the moving picture feature data having been generated by said moving picture feature extraction means on the basis of said inputted moving picture data, and calculates in turn a partial correlation value between a part of the moving picture feature data of the moving picture included in said moving picture data base and a moving picture feature data of each division of the divided moving picture feature data, upon which eliminating the moving picture segment included in said moving picture data base from the candidates of similar moving pictures when it has a feature data with a partial correlation value lower than a predetermined threshold value.

In accordance with a thirteenth aspect of the present invention, there is provided a picture retrieving device wherein said moving picture feature data correlation measuring means divides the moving picture feature data having been generated by said moving picture feature extraction means in respect with said inputted moving picture data, and calculates in turn a partial correlation value between a part of the moving picture feature data of the moving picture included in said moving picture data base and a partial moving picture feature data of each division of the divided moving picture feature data, upon which eliminating the moving picture segment included in said moving picture data base from the candidates of similar moving pictures at the time when it is acknowledged that a number of partial moving picture feature data having a feature data with a partial correlation value lower than a predetermined threshold value surpasses a predetermined threshold value.

In accordance with a fourteenth aspect of the present invention, there is provided a picture retrieving device wherein said resized picture generating means divides a picture into blocks, and takes out from each block color information representative of each block.

In accordance with a fifteenth aspect of the present invention, there is provided a picture retrieving device wherein said resized picture generating means takes out DC components from said each block when said picture data is compressed by blocks.

In accordance with a sixteenth aspect of the present invention, there is provided a picture feature extraction method comprising: a resized picture generating step for generating a resized picture from still picture data; a frequency analyzing step for executing a frequency analysis on said resized picture having been generated by said resized picture generating step; and a DC/partial AC component extracting step for taking out DC components and a part of AC components obtained as a result of the analysis at said frequency analyzing step as a picture feature data.

In accordance with a seventeenth aspect of the present invention, there is provided a picture feature extraction method comprising: a still picture data storing step for storing said still picture data; and a still picture feature data storing step for storing said still picture feature data generated for each still picture data stored at said still picture data storing step.

In accordance with an eighteenth aspect of the present invention, there is provided a picture feature extraction method comprising: a feature data extracting frame selecting step for taking out some data corresponding to the entire frames or a portion of the frames from the moving picture data, selecting the data subjected to processing; a resized picture generating step for generating a resized picture from data corresponding to each frame having been taken out; a frequency analyzing step for executing a frequency analysis on said resized picture having been generated at said resized picture generating step; a DC/partial AC component extracting step for taking out DC components and a part of AC components obtained as a result of the analysis at said frequency analyzing step as a frame feature data; and a moving picture feature data producing step for producing a moving picture feature data by collecting said frame feature data outputted from said DC/partial AC component extracting step.

In accordance with a nineteenth aspect of the present invention, there is provided a picture feature extraction method comprising: a moving picture data storing step for storing said moving picture data; and a moving picture feature data storing step for storing said moving picture feature data generated for each moving picture data stored at said moving picture data storing step.

In accordance with a twentieth aspect of the present invention, there is provided a picture feature extraction method comprising: a picture data identifying step for identifying whether the inputted picture data is of still pictures or of moving pictures; a still picture feature extraction step including a resized picture generating step for generating a resized picture from the picture data identified as still picture data at said picture data identifying step, a frequency analyzing step for executing a frequency analysis on said resized picture having been generated at said resized picture generating step, and a DC/partial AC component extracting step for taking out DC components and a part of AC components obtained as a result of the analysis at said frequency analyzing step as a still picture feature data; and a moving picture feature extraction step including a feature data extracting frame selecting step for taking out some data corresponding to the entire frames or a portion of the frames from the picture data identified as moving picture data at said picture data identifying step, selecting the data subjected to processing, a resized picture generating step for generating a resized picture from data corresponding to each frame having been taken out, a frequency analyzing step for executing a frequency analysis on said resized picture having been generated at said resized picture generating step, a DC/partial AC component extracting step for taking out DC components and a part of AC components obtained as a result of the analysis at said frequency analyzing step as a frame feature data, and a moving picture feature data producing step for generating a moving picture feature data by collecting said frame feature data outputted at said DC/partial AC component extracting step.

In accordance with a twenty-first aspect of the present invention, there is provided a picture feature extraction method comprising: a picture data storing step for storing said picture data; and a picture feature data storing step using each picture data stored at said picture data storing step for storing the still picture feature data generated at said still picture feature extraction step and the moving picture feature data generated at said moving picture feature extraction step as a picture feature data.

In accordance with a twenty-second aspect of the present invention, there is provided a picture feature extraction method wherein said resized picture generating step divides a still picture into blocks, and takes out from each block color data representative of each block.

In accordance with a twenty-third aspect of the present invention, there is provided a picture feature extraction method wherein in case when said picture data is compressed by blocks, said resized picture generating step takes out from each block DC components.

In accordance with a twenty-fourth aspect of the present invention, there is provided a picture retrieving method comprising: a still picture feature extraction step including a resized picture generating step for generating a resized picture from still picture data, a frequency analyzing step for executing a frequency analysis on said resized picture having been generated at said resized picture generating step, and a DC/partial AC component extracting step for taking out DC components and a part of AC components obtained as a result of the analysis at said frequency analyzing step as a picture feature data; a still picture feature data correlation measuring step for calculating a correlation value between the still picture feature data of the still picture within a still picture data base where the still picture feature data of the still picture data having been previously generated at said still picture feature extraction step is stored together with the still picture data and the still picture feature data generated at said still picture feature extraction step on the basis of the inputted still picture data; and a similar still picture retrieving step for retrieving the still picture within said still picture data base having a high correlation value with respect to the still picture feature data generated on the basis of the inputted still picture data as a candidate of similar still picture.

In accordance with a twenty-fifth aspect of the present invention, there is provided a picture retrieving method comprising: a moving picture feature extraction step including a feature data extracting frame selecting step for taking out some data corresponding to the entire frames or a portion of the frames from the moving picture data, selecting the data subjected to processing, a resized picture generating step for generating a resized picture from data corresponding to each frame having been taken out, a frequency analyzing step for executing a frequency analysis on said resized picture having been generated by said resized picture generating step, a DC/partial AC component extracting step for taking out DC components and a part of AC components obtained as a result of the analysis at said frequency analyzing step as a frame feature data, and a moving picture feature data producing step for producing a moving picture feature data by collecting said frame feature data outputted at said DC/partial AC component extracting step; a moving picture feature data correlation measuring step for calculating a correlation value between the moving picture feature data of the moving picture within a moving picture data base where the moving picture feature data of the moving picture data having been previously generated at said moving picture feature extraction step is stored together with the moving picture data and the moving picture feature data generated at said moving picture feature extraction step on the basis of the inputted moving picture data; and a similar moving picture retrieving step for retrieving the moving picture within said moving picture data base having a high correlation value with respect to the moving picture feature data generated on the basis of the inputted moving picture data as a candidate of similar moving picture.

In accordance with a twenty-sixth aspect of the present invention, there is provided a picture retrieving method wherein said moving picture feature data correlation measuring step has a step of dividing the moving picture feature data having been generated by said moving picture feature extraction step on the basis of said inputted moving picture data, and a step of calculating in turn a partial correlation value between a part of the moving picture feature data of the moving picture included in said moving picture data base and a moving picture feature data of each division of the divided moving picture feature data, and said similar picture retrieving step eliminates the moving picture segment included in said moving picture data base from the candidates of similar moving pictures when it has a feature data with a partial correlation value lower than a predetermined threshold value.

In accordance with a twenty-seventh aspect of the present invention, there is provided a picture retrieving method wherein said moving picture feature data correlation measuring step has a step of dividing the moving picture feature data having been generated by said moving picture feature extraction step on the basis of said inputted moving picture data, and a step of calculating in turn a partial correlation value between a part of the moving picture feature data of the moving picture included in said moving picture data base and a partial moving picture feature data of each division of the divided moving picture feature data, and said similar picture retrieving step eliminates the moving picture segment included in said moving picture data base from the candidates of similar moving pictures at the time when it is acknowledged that a number of partial moving picture feature data having a feature data with a partial correlation value lower than a predetermined threshold value surpasses a predetermined threshold value.

In accordance with a twenty-eighth aspect of the present invention, there is provided a picture retrieving method comprising: a first picture feature data correlation measuring step for calculating a correlation value between a still picture feature data of a still picture in inputted still picture data generated by a still picture feature extraction step including a resized picture generating step for generating a resized picture from the inputted picture data identified as still picture data, a frequency analyzing step for executing a frequency analysis on said resized picture having been generated at said resized picture generating step, and a DC/partial AC component extracting step for taking out DC components and a part of AC components obtained as a result of the analysis at said frequency analyzing step as a still picture feature data and a picture feature data of a picture within a picture data base where a still picture feature data having been generated at said still picture feature extraction step on the basis of a still picture data is stored together with said still picture data; a similar still picture retrieving step for retrieving the picture within said picture data base having a high correlation value with respect to the picture feature data generated on the basis of the inputted picture data as a candidate of similar still picture; a second picture feature data correlation measuring step for calculating a correlation value between a moving picture feature data of a moving picture in inputted moving picture data generated by a moving picture feature extraction step including a feature data extracting frame selecting step for taking out some data corresponding to the entire frames or a portion of the frames from the picture data identified as moving picture data, selecting the data subjected to processing, a resized picture generating step for generating a resized picture from data corresponding to each frame having been taken out, a frequency analyzing step for executing a frequency analysis on said resized picture having been generated by said resized picture generating step, a DC/partial AC component extracting step for taking out DC components and a part of AC components obtained as a result of the analysis at said frequency analyzing step as a frame feature data, and a moving picture feature data producing step for generating a moving picture feature data by collecting said frame feature data outputted at said DC/partial AC component extracting step, and a picture feature data of a picture within a picture data base where a moving picture feature data having been generated at said moving picture feature extraction step on the basis of a moving picture data is stored together with said moving picture data; and a similar moving picture retrieving step for retrieving a moving picture segment within said picture data base having a high correlation value with respect to the moving picture feature data generated on the basis of the inputted moving picture data as a candidate of similar moving picture.

In accordance with a twenty-ninth aspect of the present invention, there is provided a picture retrieving method wherein said second picture feature data correlation measuring step has a step of dividing the moving picture feature data having been generated by said moving picture feature extraction step on the basis of said inputted moving picture data, and a step of calculating in turn a partial correlation value between a part of the moving picture feature data of the moving picture included in said moving picture data base and a moving picture feature data of each division of the divided moving picture feature data, and said similar picture retrieving step eliminates the moving picture segment included in said moving picture data base from the candidates of similar moving pictures when it has a feature data with a partial correlation value lower than a predetermined threshold value.

In accordance with a thirtieth aspect of the present invention, there is provided a picture retrieving method wherein said second picture feature data correlation measuring step has a step of dividing the moving picture feature data having been generated by said moving picture feature extraction step on the basis of said inputted moving picture data, and a step of calculating in turn a partial correlation value between a part of the moving picture feature data of the moving picture included in said moving picture data base and a partial moving picture feature data of each division of the divided moving picture feature data, and said similar picture retrieving step eliminates the moving picture segment included in said moving picture data base from the candidates of similar moving pictures at the time when it is acknowledged that a number of partial moving picture feature data having a feature data with a partial correlation value lower than a predetermined threshold value surpasses a predetermined threshold value.

In accordance with a thirty-first aspect of the present invention, there is provided a picture retrieving method wherein said resized picture generating step divides a picture into blocks, and takes out from each block color information representative of each block.

In accordance with a thirty-second aspect of the present invention, there is provided a picture retrieving method wherein said resized picture generating step takes out DC components from said each block when said picture data is compressed by blocks.

BRIEF DESCRIPTION OF THE DRAWINGS

The above and further objects and the novel feature of the invention will more fully appear from the following detailed description when the same is read in connection with the accompanying drawings, in which:

FIG. 6 is a block diagram showing an example of structure of an embodiment of the present invention where a picture retrieving device and a method thereof are used;

FIG. 7 is a block diagram showing an example of structure of an embodiment of the present invention where a picture retrieving device and a method thereof are used;

FIG. 10 is a table showing an example of retrieval result of the present invention and grid layout based method.

DESCRIPTION OF THE PREFERRED EMBODIMENTS

Figure 1:
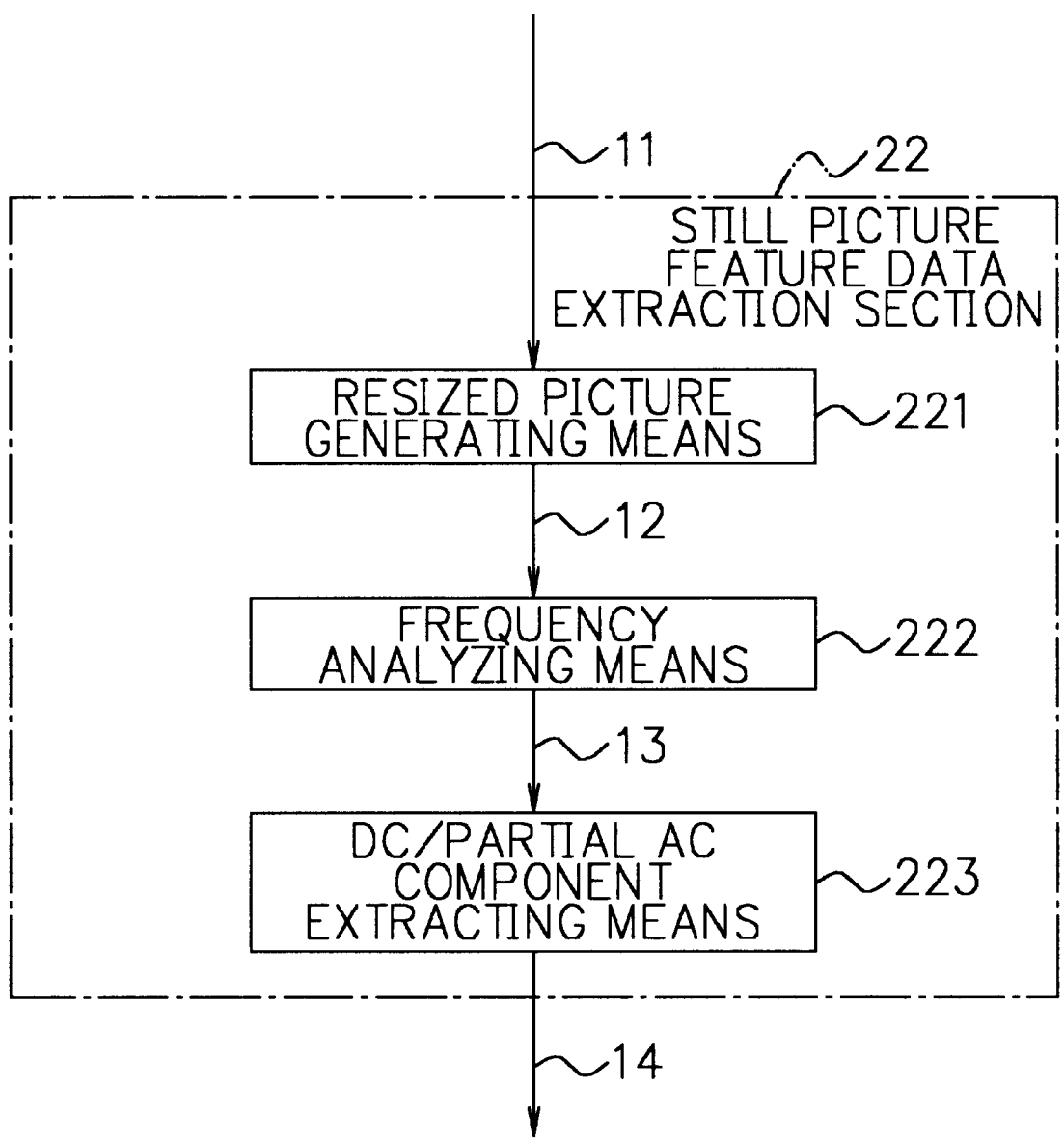
FIG. 1 is a block diagram showing an example of structure of an embodiment of the present invention where a picture feature extraction device and a method thereof are used.

Referring now to the drawings, a detail description of preferred embodiments of the present invention will be described in detail.

In FIG. 1 to FIG. 10, the embodiments of the picture feature extraction device, picture retrieving device, and methods of generating picture feature data and retrieving pictures, respectively, are illustrated.

A first embodiment of the picture feature extraction device and method thereof in accordance with the present invention will be described in detail with reference to FIG. 1.

The picture feature extraction device in the first embodiment as shown in FIG. 1 comprises a still picture feature extraction section 22 for inputting still picture data and generating the feature data of that still picture data having been inputted. The still picture feature extraction section 22 has a resized picture generating means 221, a frequency analyzing means 222, and a DC/partial AC component extracting means 223.

The resized picture generating means 221 generates a resized picture 12 on the basis of an input of still picture data 11. The resized picture at this time can take any size. As to an example of a method of producing a resized picture, there is a method in which a picture is divided into blocks, and only color data representative of each block is taken out. In this case, as to the representative color data for each block, an average color, the most frequently used color, etc., can be used. Furthermore, in case when the picture data is compressed by blocks, it is possible to produce a resized picture by taking out the DC components from each block, and it is possible to produce a resized picture from said resized picture produced by taking out the DC components from each block. Any resolutions of the input picture can be allowed by resizing the input picture to a fixed size.

The frequency analyzing means 222 conducts a frequency analysis on the resized picture 12 so as to calculate frequency components 13. It is also possible to divide the resized picture 12 into a plurality of areas before executing the frequency analysis. As to a method of frequency analysis of the resized picture, DCT transformation, Wavelet transformation, Fourier transformation, Hadamard transformation, and so forth can be used.

The DC/partial AC component extracting means 223 extracts DC/partial AC components 14 from the frequency components 13 having been calculated by the frequency analyzing means 222 to generate a feature data. As to a specific example of the application of the frequency analyzing means 222 and the DC/partial AC component extracting means 223, the frequency analysis can be executed by a two-dimensional DCT with respect to the whole size of the resized picture, so as to extract the DC components as well as n AC components from the calculated frequency components. Furthermore, it is also possible to extract only the luminance coefficients, or extract only the chrominance coefficients, or part of both kinds of coefficients.

In accordance with the above-described picture feature extraction device and method thereof, the frequency analysis is executed on the resized picture, and only a part of the acquired coefficients are used, whereby picture feature data requiring less memory capacity can be made available.

A second embodiment of the picture feature extraction device and method thereof in accordance with the present invention will be described in detail with reference to FIG. 2.

Figure 2:
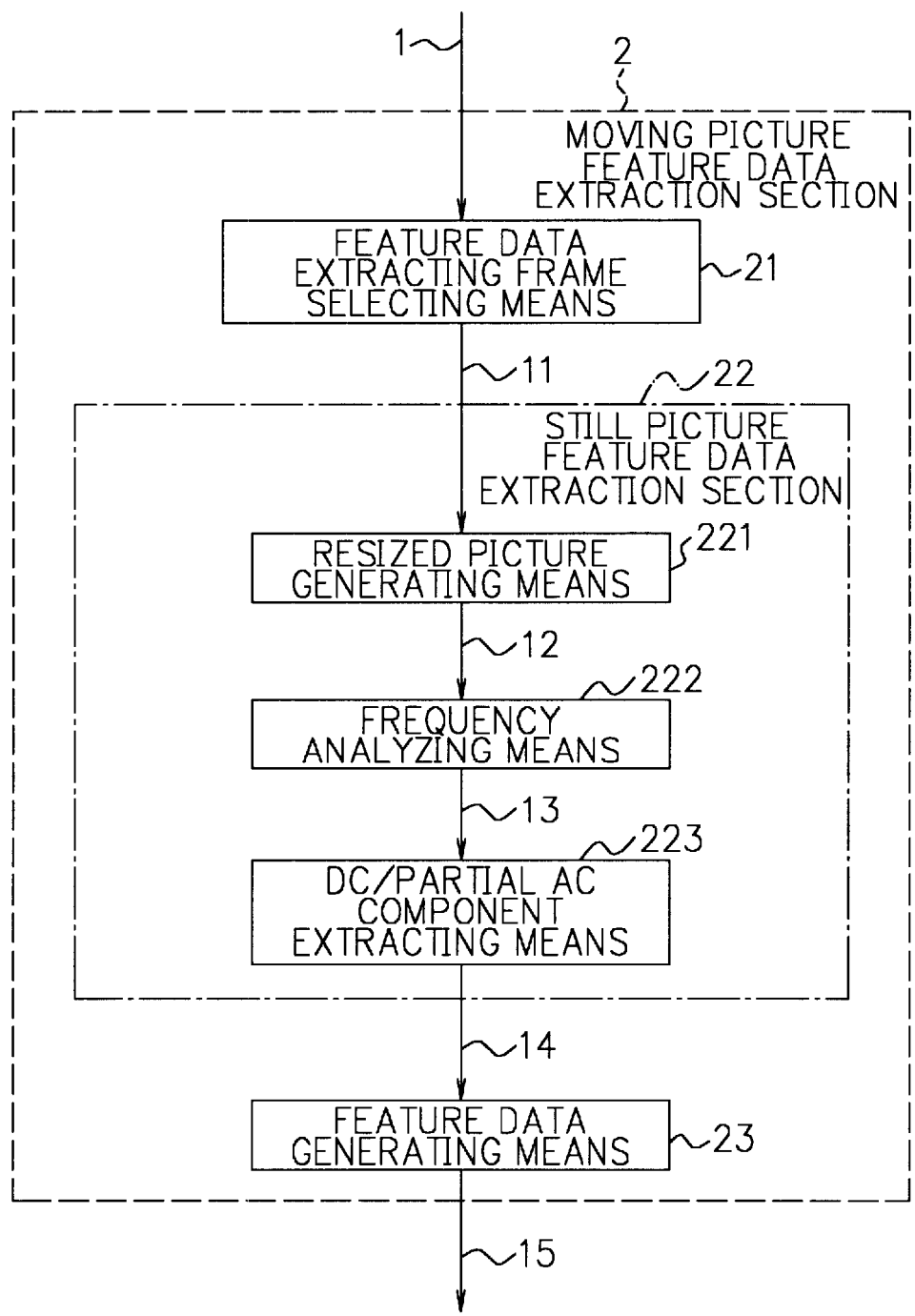
FIG. 2 is a block diagram showing an example of structure of an embodiment of the present invention where a picture feature extraction device and a method thereof are used.

The picture feature extraction device in the second embodiment as shown in FIG. 2 comprises a moving picture feature extraction section 2 for inputting moving picture data and generating the feature data of that moving picture data having been inputted. The moving picture feature extraction section 2 has a feature data extracting frame selecting means 21, a still picture feature extraction section 22, and a feature data generating means 23. As already mentioned, the still picture feature extraction section 22 has a resized picture generating means 221, a frequency analyzing means 222, and a DC/partial AC component extracting means 223. Moving picture by definition is made of a plurality of still pictures, and therefore, even when the subject here in the second embodiment is moving pictures, it is possible to use the still picture feature extraction section 22 in this embodiment as in the first embodiment.

The feature data extracting frame selecting means 21 as being a constituent of the moving picture feature extraction section 2 selects frame data 11 subjected to extraction of feature data on the basis of inputted moving picture data 1.

The feature data extracting frame selecting means 21 can take out the entire frames or a portion of the frames in the moving picture data. The feature data extracting frame selecting means can also take out only the compressed data corresponding to an interframe encoded frame (I-picture) of which compression process is completed within a single frame in the moving picture data. It is also possible to select the all I-Pictures or only a part of the I-Pictures. Furthermore, as to forward prediction encoded frames and bi-directional prediction encoded frames of which compression process is not completed within a frame, it is possible to produce the I-Picture in a pseudo-manner, using the method as introduced in "On the extraction of DC sequence from MPEG Compressed Video" by Boon-Lock Yeo and Bede Liu (IEEE International Conference on Image Processing, 1995). In this way, it is possible to produce the I-Picture in a pseudo-manner, and select them.

The resized picture generating means 221 constituting the still picture feature extraction section 22 generates a resized picture on the basis of the still picture data 11 selected by the feature data extracting frame selecting means 21. The frequency analyzing means 222 decomposes the resized picture 12 into frequency components 13. The DC/partial AC component extracting means 223 extracts the DC/partial AC components 14 from the frequency components 13 having been given by the frequency analyzing means 222.

The feature data generating means 23 generates feature data 15 by extracting the DC/partial AC components 14 given by the still picture feature extraction section 22 with respect to the whole selected frames.

In accordance with this embodiment also, in the picture feature extraction device and method thereof, the frequency analysis is executed on the resized picture, and only a part of the acquired coefficients are used, whereby picture feature data requiring less memory capacity can be made available.

A third embodiment of the picture feature extraction device and method thereof in accordance with the present invention will be described in detail with reference to FIG. 3.

Figure 3:
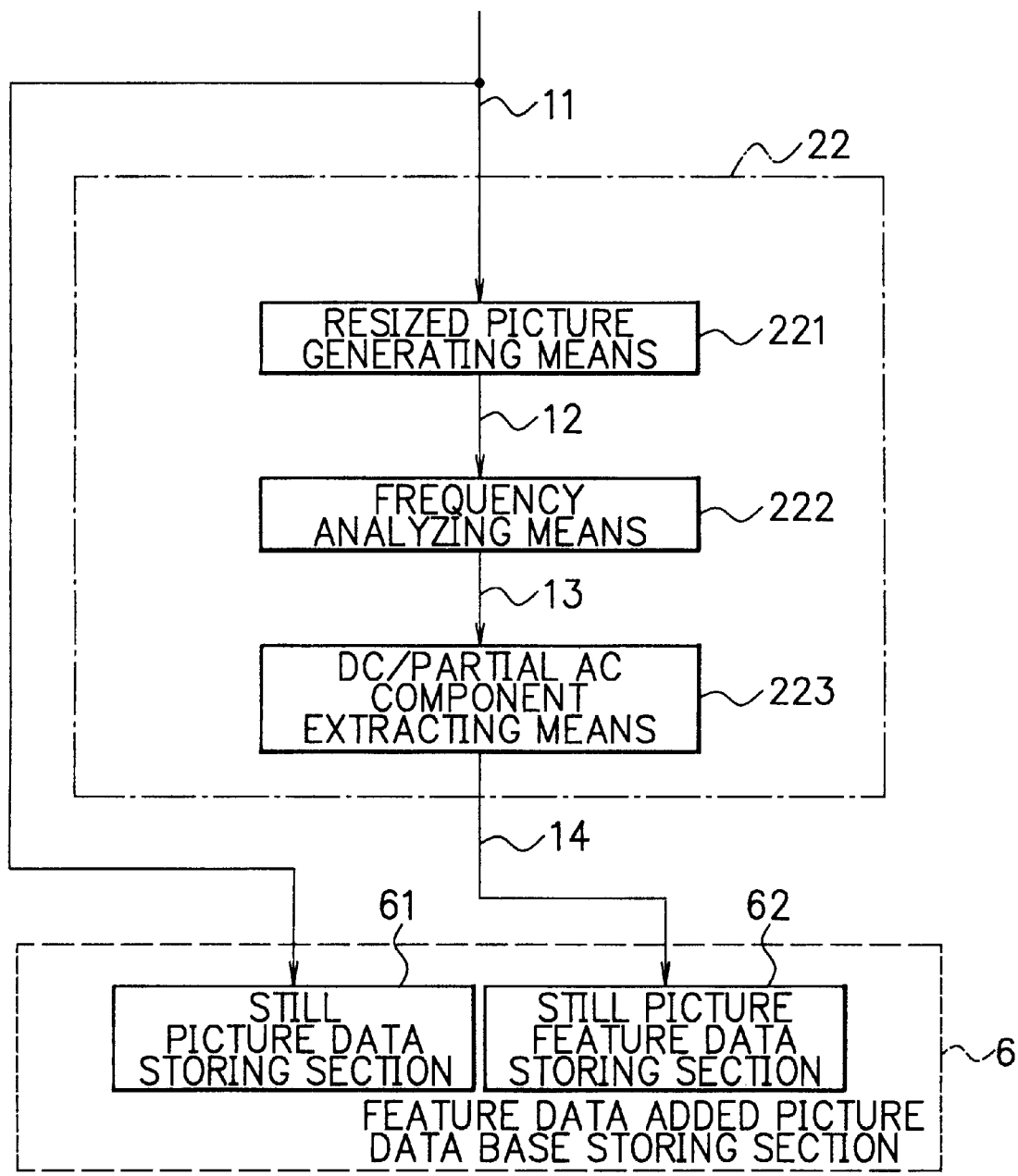
FIG. 3 is a block diagram showing an example of structure of an embodiment of the present invention where a picture feature extraction device and a method thereof are used.

The picture feature extraction device in the third embodiment as shown in FIG. 3 comprises a still picture feature extraction section 22 for inputting still picture data and generating the feature data of that still picture data having been inputted, and a feature data added still picture data base storing section 6. The feature data added still picture data base storing section 6 has a still picture data storing section 61 for storing the inputted still picture data, and a still picture feature data storing section 62 for storing the still picture feature data having been generated at the still picture feature extraction section 22. The still picture feature extraction section 22 has a resized picture generating means 221, a frequency analyzing means 222, and a DC/partial AC component extracting means 223.

In the still picture feature extraction section 22, the resized picture generating means 221 generates a resized picture on the basis of the inputted still picture data, the frequency analyzing means 222 conducts a frequency analysis of the resized picture having been generated by the resized picture generating means 221, and the DC/partial AC component extracting means 223 takes out the DC components and a part of AC components obtained as a result of frequency analysis. Thus the still picture feature extraction section 22 generates the still picture feature data.

The still picture feature data having been generated is to be stored in the still picture feature data storing section 62, while the still picture data used in generating the still picture feature data is to be stored in the still picture data storing section 61.

In accordance with this embodiment also, in the picture feature extraction device and method thereof, the frequency analysis is executed on the resized picture, and only a part of the acquired coefficients are used, whereby picture feature data requiring less memory capacity can be made available.

Figure 4:
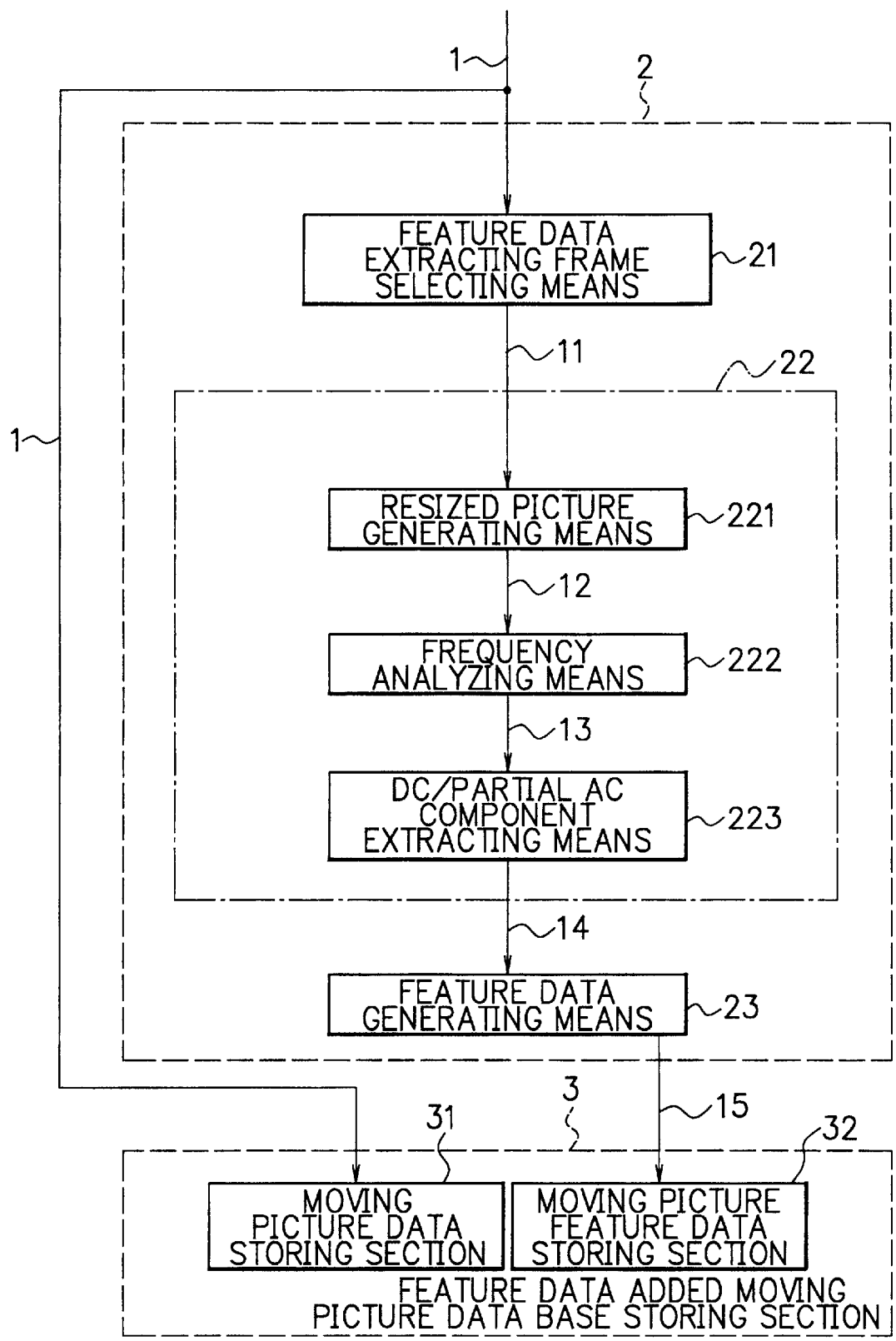
FIG. 4 is a block diagram showing an example of structure of an embodiment of the present invention where a picture feature extraction device and a method thereof are used.

As shown in FIG. 4, the picture feature extraction device in a fourth embodiment of the picture feature extraction device and method thereof, has a moving picture feature extraction section 2, and a feature data added moving picture data base storing section 3. As to the moving picture feature extraction section 2, the description thereof will be omitted.

In this embodiment, feature data 15 is generated from moving picture data 1, and both the feature data 15 and the moving picture data 1 are stored in the feature data added moving picture data base storing section 3.

The feature data added moving picture data base storing section 3 is composed of a moving picture data storing section 31, and a moving picture feature data storing section 32. With respect to various moving picture data 1, the feature data added moving picture data base storing section 3 stores both the moving picture data 1 and the feature data 15 having been generated by the feature extraction section 2 on the basis of the moving picture data 1.

The moving picture data storing section 31 which is one of the two constituents of the feature data added moving picture data base storing section 3 stores the moving picture data 1. The moving picture feature data storing section 32 stores the feature data 15 having been generated by the feature extraction section 2 on the basis of the moving picture data 1.

In accordance with the picture feature extraction device comprising the above mentioned components, data corresponding to the entire frames or a portion of the frames is taken out from the moving picture data by the feature data extracting frame selecting means 21. Then the resized picture generating means 221 generates a resized picture from the data corresponding to each frame being taken out. Then the frequency analyzing means 222 executes the frequency analysis of the resized picture having been produced by the resized picture generating means 221. Then the DC/partial AC component extracting means 223 takes out the DC components and a part of AC components obtained as a result of the frequency analysis, and the feature data generating means 23 is to execute the process with respect to the whole selected frames in order to generate the feature data 15.

In the picture feature extraction device of this embodiment, the frequency analysis is executed on the resized picture of part of the frames, and only a part of the acquired coefficients are used, whereby picture feature data requiring less memory capacity can be made available.

A fifth embodiment of the picture feature extraction device and method thereof in accordance with the present invention will be described in detail with reference to FIG. 5.

Figure 5:
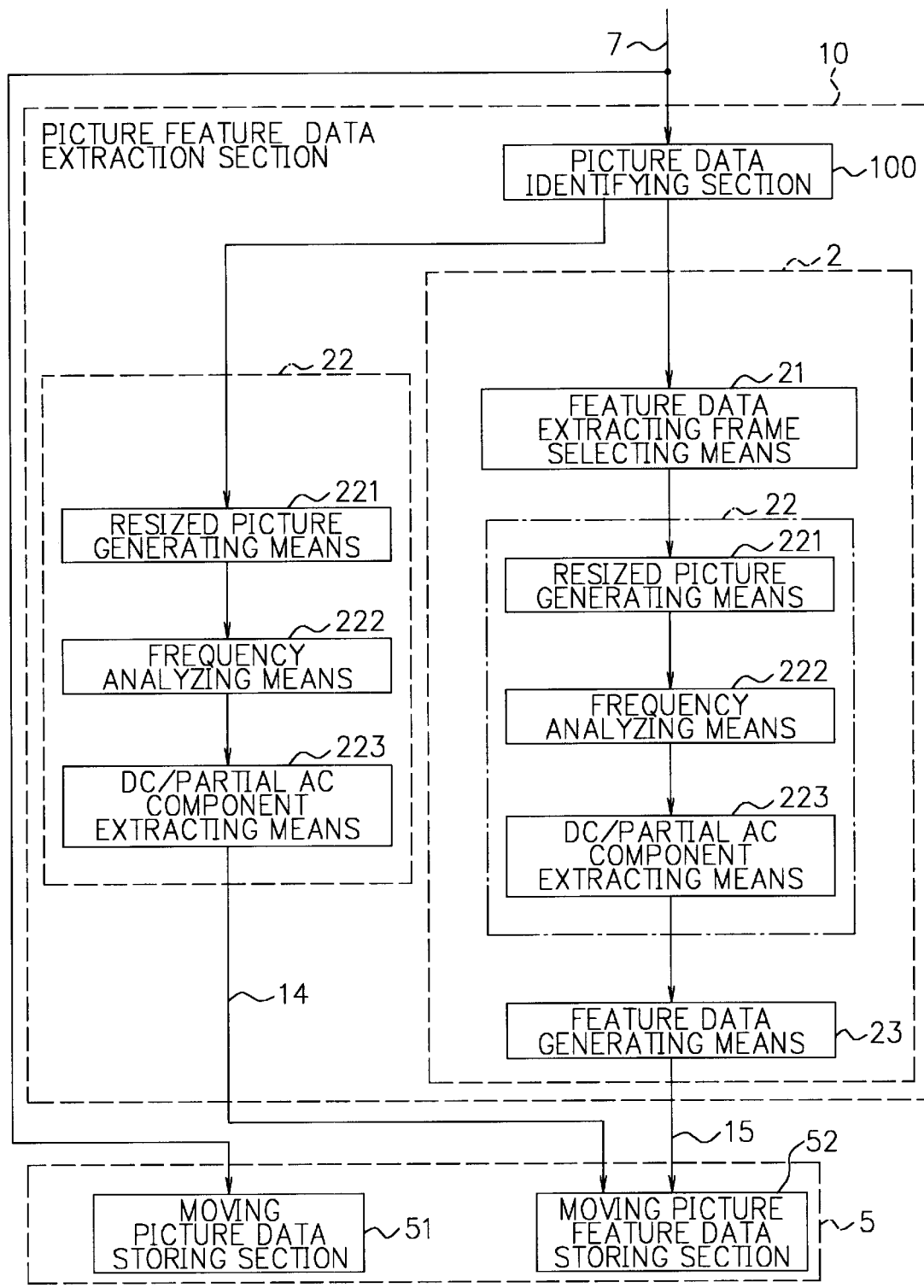
FIG. 5 is a block diagram showing an example of structure of an embodiment of the present invention where a picture feature extraction device and a method thereof are used.

As illustrated in FIG. 5, the picture feature extraction device of the fifth embodiment comprises a picture feature extraction section 10 and a feature data added picture data base storing section 5. The picture feature extraction section 10 comprises a picture data identifying section 100, a still picture feature extraction section 22, and a moving picture feature extraction section 2. The picture data in this embodiment is defined as including the moving picture data and the still picture data, and the moving picture data would be composed of a plurality of still pictures.

In this embodiment, as the picture data identifying section 100 receives the picture data 7, it determines whether the inputted picture data is of still pictures or moving pictures. In case when the picture data is of still pictures, the picture data is inputted to the still picture feature extraction section 22, while in case when the picture data is of moving pictures, the picture data is inputted to the moving picture feature extraction section 2.

In the still picture feature extraction section 22, the resized picture generating means 221 generates a resized picture on the basis of the inputted still picture data, the frequency analyzing means 222 conducts a frequency analysis on the resized picture having been generated by the resized picture generating means 221, and the DC/partial AC component extracting means 223 takes out the DC components and a part of AC components obtained as a result of the frequency analysis, thus generating the feature data.

In the moving picture feature extraction section 2, data corresponding to the entire frames or a portion of the frames is taken out from the moving picture data by the feature data extracting frame selecting means 21. Then the resized picture generating means 221 generates a resized picture from the data corresponding to each frame being taken out. Then the frequency analyzing means 222 executes the frequency analysis on the resized picture having been produced by the resized picture generating means 221. Then the DC/partial AC component extracting means 223 takes out the DC components and a part of AC components obtained as a result of the frequency analysis, and the feature data generating means 23 is to execute the process with respect to the entire frames being selected in order to generated the feature data.

In accordance with the above-mentioned process, the feature data from the still picture feature extraction section and the feature data 15 from the moving picture feature extraction section 2 are each stored in a picture feature data storing section 52 of the feature data added picture data base storing section 5. Furthermore, the picture data composed of moving and still pictures, respectively are stored in a picture data storing section 51.

Thus, when the still picture is inputted, the frequency analysis is executed on the resized picture, and only a part of the acquired coefficients are used in generating the feature data, while when the moving picture is inputted, the frequency analysis is executed on the resized picture of a part of the frames, and only a part of the acquired coefficients are used in generating the feature data. Therefore, the still picture feature data as well as moving picture feature data requiring less memory capacity can be made available.

Referring now to FIG. 6, a first embodiment of the picture retrieving device and method thereof will be described.

As shown in FIG. 6, in this embodiment, the picture retrieving device comprises a still picture feature extraction section 22 for inputting still picture data and generating the feature data of that still picture data having been inputted, a feature data added still picture data base storing section 6 including a still picture data storing section 61 for storing the inputted still picture data and a still picture feature data storing section 62 for storing the still picture feature data having been generated from the still picture feature extraction section 22, and a still picture correlation measuring section 41 for calculating a correlation value between the still picture feature data having been generated from the inputted still picture data by the still picture feature extraction section 22 and the still picture feature data stored in the feature data added still picture data base storing section 6.

In the still picture feature extraction section 22, the resized picture generating means 221 generates a resized picture on the basis of the inputted still picture data, the frequency analyzing means 222 conducts a frequency analysis on the resized picture having been generated by the resized picture generating means 221, and the DC/partial AC component extracting means 223 takes out the DC components and a part of AC components obtained as a result of the frequency analysis. Thus the still picture feature extraction section 22 generates the still picture feature data with respect to the inputted still picture data 11.

In the feature data added still picture data base storing section 6, through the same process as described in the above third embodiment of the picture feature extraction device, the still picture has been stored in the still picture data storing section 61, and the still picture feature data calculated by the still picture feature extraction section 22 using the still picture stored in the still picture data storing section 61 has been stored in the still picture feature data storing section 62.

The still picture correlation measuring section 41 is to calculate the correlation value between the feature data having been generated from the inputted still picture data by the still picture feature extraction section 22 and the feature data having been generated from the picture included in the picture data base. Then the still picture correlation measuring section 41 is to retrieve the still picture in the data base having a high correlation value as a candidate of a similar still picture.

Figure 8:
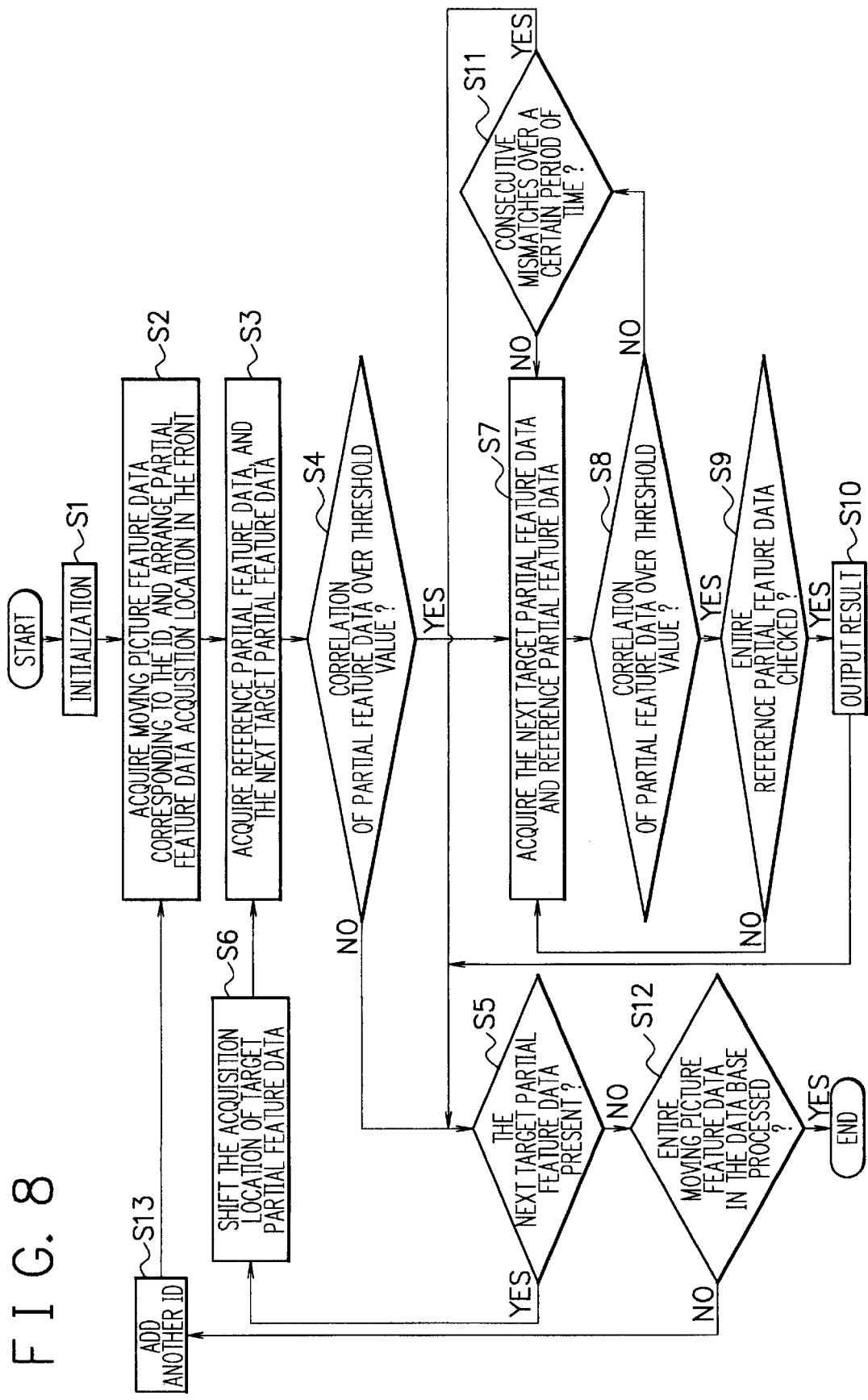
FIG. 8 is a flow chart showing an example of processing in the picture retrieving method of the present invention.

Referring now to FIG. 7 and FIG. 8, a second embodiment of the picture retrieving device and method thereof will be described. FIG. 7 is a block diagram showing the structure of the picture retrieving device in the second embodiment of the picture retrieving device and method thereof. FIG. 8 is a flow chart showing a process of correlation measurement in the picture retrieving method.

As shown in FIG. 7, the picture retrieving device in the second embodiment comprises a feature extraction section 2, a feature data added moving picture data base storing section 3, and a correlation measuring section 4 for calculating a correlation value between feature data 17 in the moving picture data base and feature data 15 having been generated by the feature extraction section 2 on the basis of the inputted moving picture data 1.

First, the moving picture data to be used for a retrieval is inputted to the feature extraction section 2, from which the feature data 15 is generated. In executing the retrieval, feature data is generated form the reference moving picture, so as to be inputted to the correlation measuring section 4.

The correlation measuring section 4 calculates a correlation value between the feature data 17 in the moving picture data base and the feature data 15 having been generated by the feature extraction section 2 on the basis of the inputted moving picture data 1. Then storage location data 18 of a partial moving picture being retrieved is outputted as a retrieving result.

The operation of the moving picture correlation measuring section 4 will be described in detail with reference to FIG. 8.

In accordance with the picture retrieving method of the present invention, the processing process for obtaining the correlation value between the feature data having been generated from the inputted moving picture data and a part of the feature data having been generated from the moving picture included in the moving picture data base consists of three steps in which the feature data having been generated from the inputted moving picture is divided in a first step, partial correlation is calculated in sequence for each of the divided parts of the feature data in a second step, and the moving picture in the data base having the feature data corresponding to the partial correlation lower than the predetermined threshold value is eliminated from the candidate pictures in a third step. By adapting such method, the candidate pictures as a result of a retrieval can be narrowed down in number through a less number of matching process, as compared to the case in which the matching process is executed on the entire designated moving picture segments in a round robin manner. This contributes to shortening the processing time required in retrieving the moving pictures. The details of this processing process will be described in the following.

First, in the initial setting, identification (ID) numbers for bringing out the moving picture feature data subjected to retrieval is initialized (step S1). In this case, the ID number is a unique number given individually to each moving picture data in generating the moving picture data base. The feature data 15 should also be previously acquired.

Next, the moving picture feature data subjected to retrieval, which corresponds to the ID is acquired, and a pointer indicating the acquisition location of the partial feature data subjected to retrieval (to be referred to as target partial feature data) is arranged in the front (step S2).

The feature data of a predetermined time length is acquired from the reference partial feature data in the front. This data is to be referred to as reference partial feature data. Furthermore, the target partial feature data is acquired from the point indicated by the pointer showing the acquisition location (step S3).

Then the correlation between the reference partial feature data and the target partial feature data acquired in step S3 will be determined (step S4).

When the acquired correlation value is lower than the predetermined threshold value, (the condition will be referred to as a mismatch judgement), the presence of the target partial feature data to be acquired next will be checked in step S5. When the presence of the next target feature data is acknowledged, the acquisition location pointer of the target partial feature data is shifted by a predetermined value (step S6), before returning to step S3. On the other hand, when the next target partial feature data is not there, another ID is added, and the same process is conducted on the following moving picture feature data (step S13). However, in case when the matching process is conducted on the entire moving picture feature data within the data base, the process is to be terminated (step S12).

In case when the correlation value is determined as larger than the predetermined threshold value, the next target partial feature data and the reference partial feature data following the acquisition location followed by a certain time length is acquired (step S7), and the correlation will be determined (step S8). As to the subsequent events, the matching process is repeated in the same manner until encountering a mismatch, and when the entire reference partial feature data match (step S9), the result will be outputted as a retrieving result (step S10).

In this occasion, it is possible to output the moving picture data ID number including the retrieving result, the start location, the end location, etc. in the moving picture data, correlation value, etc.

In case when the mismatch judgement is given, it is to be determined whether a predetermined number of mismatch judgements or a predetermined period of time having been separately set has surpassed (step S11). If not surpassed, the process returns to step S7. If surpassed, the process returns to step S5. In step S11, temporal mismatches caused by a difference in a temporal position of a frame, a difference in camera work, a change in the feature data due to screen noises, etc. can be resolved by appropriately setting the number of times and a period of time with respect to the mismatch judgements. Furthermore, setting the number of times and a period of time to "0" is the same as eliminating step S11, and thus it is also possible to simplify the circuit design.

On the other hand, it is also possible to consider the time length in acquiring the reference partial feature data as of the entire reference feature data, so as to compare the correlation with the retrieving partial feature data one at a time, thus executing the retrieval.

A third embodiment of the picture retrieving device and method thereof in accordance with the present invention will be described in detail with reference to FIG. 9.

Figure 9:
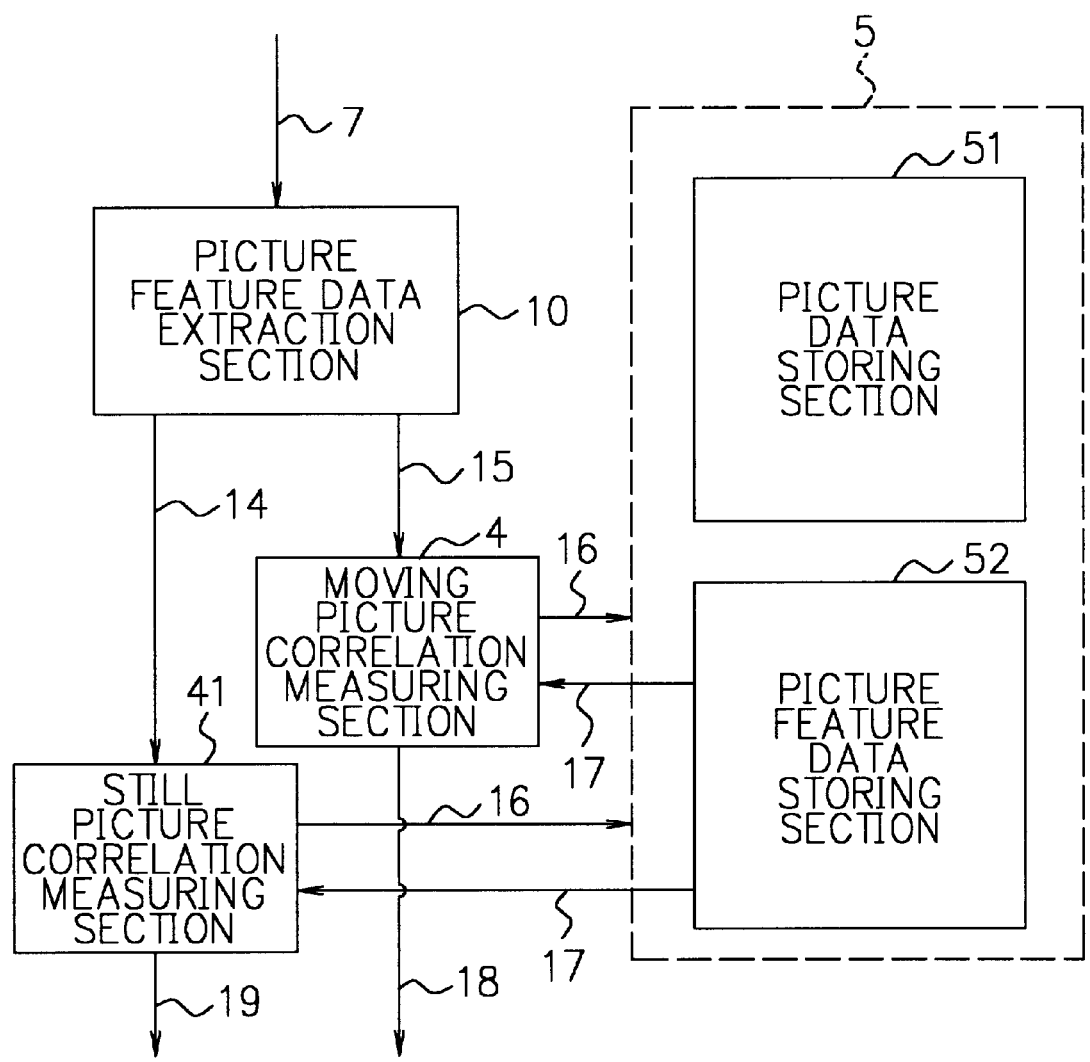
FIG. 9 is a block diagram showing an example of structure of an embodiment of the present invention where a picture retrieving device and a method thereof are used.

As shown in FIG. 9, the picture retrieving device of this embodiment comprises a picture feature extraction section 10, a feature data added picture data base storing section 5 including a picture data storing section 51 for storing still pictures and moving pictures and a picture feature data storing section 52 storing the still picture feature data and the moving picture feature data having been previously generated by the picture feature extraction section 10 on the basis of the picture data stored in the picture data storing section, a moving picture correlation measuring section 4 for calculating a correlation value between feature data 17 in the moving picture data base and feature data 15 having been generated by the feature extraction section 2 with respect to the inputted moving picture data 1, and a still picture correlation measuring section 41 for calculating the correlation value between the feature data 17 in the picture data base and the feature data having been generated by the picture feature extraction section 10 on the basis of the inputted still picture data 11.

First, picture data 1 used in a retrieval is inputted to generate the feature data 15 by the feature extraction section 2. In case when the picture data for reference is of moving pictures, feature data is generated from the moving picture by the feature extraction section 10 to be inputted to the moving picture feature data correlation measuring section 4. In case when the picture data for reference is of still pictures, feature data is generated from the still picture by the feature extraction section 10 to be inputted to the still picture feature data correlation measuring section 41.

The moving picture correlation measuring section 4 is to calculate the correlation value between the feature data 17 within the moving picture data base and the feature data 15 generated by the feature extraction section 2 on the basis of the inputted moving picture data 1. Then it outputs storage location data 18 on the partial moving picture having been retrieved as a retrieving result. The explanation on the processing operation in this embodiment will be omitted for the explanation has already been given in the description of the second embodiment of the moving picture feature extraction device.

The still picture correlation measuring section 41 is to calculate the correlation value between the feature data having been generated from the inputted still picture data by the feature extraction section 10 and the feature data generated by the picture included in the picture data base, so as to retrieve a still picture within the data base having a high correlation value as a candidate for a similar still picture.

In the following, an example of an embodiment of the present invention will be described.

An experiment is conducted using 50 queries among 5466 still pictures, where the correct results for those 50 queries are pre-defined by human judgement based on similarity.

First, all still pictures are divided into 64 (8×8) blocks and average color of each block is taken out. The derived average colors are transformed into a series of coefficients by 8×8 DCT. Three DC coefficients, five luminance AC coefficients and two components per each chrominance AC coefficients normalized within the range of [0, 255] for each component are used as feature data.

FIG. 10 shows a comparison between using DCT coefficients on a picture resized to 8×8 pixels and 2×2, 3×3, 4×4 grid layout and average color within the range of [0, 255] for each color component as feature data. Correct retrieval rate means how many of the correct pictures are detected within top K ranks when all the images are sorted according to a weighted Euclidean distance between feature data of a query picture and stored pictures. Here K denotes a number of correct results multiplied by four. FIG. 10 indicates that DCT coefficients perform better than any grid based feature data with smaller size of feature data.

In the following, another example of an embodiment of the present invention will be described.

An experiment is conducted using 20 hours worth of video data being encoded by MPEG-1, MPEG-2 encodings, where a certain video segment corresponding to a particular article, TV commercial, and an opening of a particular program is designated in retrieving a video segment seemingly identical to the designated video segment.

First, a time code and DC components are extracted from each compressed data corresponding to I-Picture within the moving picture as a whole subjected to retrieval. In this occasion, the resized picture having been generated by extracting the DC components is further resized to a fixed size of 8 pixel×8 pixel and exposed to DCT to obtain three DC luminance and chrominance components (to be referred to as DC_Y, DC_Cb, and DC_Cr), as well as 5 luminance AC components, 2 components per each chrominance AC component (to be referred to as AC_Y, AC_Cb, and AC_Cr), which are normalized within the range of [0, 255] for each DC and AC component and stored together with the time codes, respectively. For each I-Picture, only a total of 16 bytes including 12 bytes of feature dada and 4 bytes of time code are required. Therefore, when the I-Pictures exist in the intervals of 0.5 seconds, the size of data of the feature data corresponding to the amount of video worthy of a portion for a single day can be managed within about 2.8 mega bytes.

The feature data of the head frame of the reference moving picture goes through a matching process with the feature data of the retrieving target moving picture in a unit of I-Picture. A candidate for the aiming moving picture is defined by determining the ones of which difference value of DC_Y, DC_Cb, and DC Cr (to be referred to as DC difference value), and the difference value of AC_Y, AC_Cb, and AC_Cr meet a certain specific condition (threshold value).

When a certain frame is determined as a candidate for the aiming moving picture, the frames ahead are to be inspected in time series. In case when the frame is not determined as a candidate for the aiming moving picture, the same process as described is to be repeated on the next frame. After that, the ones of which DC difference values meet the specified condition are to be regarded as the matched ones, and the inspection is to be conducted in due order. For the purpose of reducing the number of times conducting the matching process, AC_Y, AC Cb, and AC_Cr can be disregarded.

Considering the errors due to sampling points, when the mismatch is determined three frames in a row, the frames are eliminated from the candidates. When the difference of feature data with respect to a length corresponding to the designated moving picture segment meets the specified condition (threshold value), it is to be determined as the aiming moving picture segment, in response to which the time codes for the start point and the end point of that certain length are outputted as a retrieving result. Furthermore, in case when the aiming moving picture segment is retrieved, the start point for the next searching can be set as the frame next to the end point of the detected section.

According to such process, compared to the case in which the matching process is conducted in a round robin manner over the entire designated moving picture segment, it is possible to reduce the amount of processing by a considerable extent.

As an experiment was conducted on 11 pairs of moving picture segments which seem identical, it was proved with the whole 11 pairs that when one of the two moving picture segments in a single pair is designated, it was possible to obtain the other one in the pair. Furthermore, even when the length of the aiming moving picture segment was set as over 3 seconds, no excessive retrieving was noted.

The above described embodiments are merely an example of the preferred embodiment of the present invention. The present invention, therefore, is not limited to such illustrative description but changes and variations may be made without departing from the subject matter of the invention. In any of the above described embodiments, the application of the present invention can be extended to a retrieving of similar moving picture segments by defining the distance between the feature data instead of excluding the ones not meeting the condition.

As it has been made clear in the above description, in accordance with the picture feature extraction device and method thereof of the present invention, the feature data is generated through generating a resized picture from the picture data, executing a frequency analysis on the generated resized picture, and taking out DC components and a part of AC components obtained as a result of the analysis.

Furthermore, in accordance with the picture feature extraction device and method thereof, data corresponding to the entire frames or part of the frames in the picture data is taken out, and the resized picture is generated from the data corresponding to each frame being taken out. The frequency analysis is conducted on the generated resized picture, the DC components and a part of AC components obtained as a result of the frequency analysis are taken out, and this process is implemented on the whole frames being selected.

In accordance with the picture retrieving device and method thereof of the present invention, it is possible to eliminate the pictures from the candidates when it becomes obvious that the picture would have no chance of being identified as a similar picture in the process of calculating the correlation. According to such process, compared to the case in which the matching process is conducted in a round robin manner over the entire designated moving, picture segment, it is possible to reduce the number of matching process for narrowing down the retrieving candidates to be regarded as the retrieving result, thus reducing the amount of processing by a considerable extent.

Furthermore, in accordance with the present invention, the frequency analysis is executed on the resized picture, and only a part of the acquired coefficients are used, whereby picture feature data requiring less memory capacity can be made available.

The present invention can widely apply to a variety of purposes such as an investigation on a broadcasting frequency, obtaining a statistics on some broadcasting information, a tendency analysis, etc., for a particular video image such as TV commercial pictures, news articles, opening of particular programs, etc.

Furthermore, the present invention can apply to a retrieving of similar picture etc., for retrieving a similar color layout picture for reference within the stored pictures.

While the preferred embodiments of the invention have been described using specific terms, such description is for illustrative purposes only, and it is to be understood that changes and variations may be made without departing from the spirit or the scope of the following claims.

What is claimed is:

1. A picture feature extraction device comprising:
   a feature data extracting frame selecting means taking out some data corresponding to the entire frames or a portion of the frames from the moving picture data, selecting the data subjected to processing;
   a resized picture generating means generating a resized picture from data corresponding to each frame having been taken out;
   a frequency analyzing means executing a frequency analysis on said resized picture having been generated by said resized picture generating means;
   a DC/partial AC component extracting means taking out DC components and a part of AC components obtained as a result of the analysis by said frequency analyzing means as a frame feature data; and
   a moving picture feature data producing means producing a moving picture feature data by collecting said frame feature data outputted from said DC/partial AC component extracting means.

2. A picture feature extraction device as claimed in claim 1, comprising:
   a moving picture data base including a moving picture data storing means storing said moving picture data, and a moving picture feature data storing means storing said moving picture feature data generated for each moving picture data stored in said moving picture data storing means.

3. A picture feature extraction device as claimed in claim 2, wherein
   said resized picture generating means divides a still picture into blocks, and takes out color data representative of each block from each block.

4. A picture feature extraction device as claimed in claim 2, wherein
   in case when said picture data is compressed by blocks, said resized picture generating means takes out DC components from each block.

5. A picture retrieving device comprising:
   a moving picture feature extraction means including a feature data extracting frame selecting means taking out some data corresponding to the entire frames or a portion of the frames from the moving picture data, selecting the data subjected to processing, a resized picture generating means generating a resized picture from data corresponding to each frame having been taken out, a frequency analyzing means executing a frequency analysis on said resized picture having been generated by said resized picture generating means, a DC/partial AC component extracting means taking out DC components and a part of AC components obtained as a result of the analysis by said frequency analyzing means as a frame feature data, and a moving picture feature data producing means producing a moving picture feature data by collecting said frame feature data outputted from said DC/partial AC component extracting means;

a moving picture data base including a moving picture feature data storing means storing the moving picture feature data previously being generated by said moving picture feature extraction means on the basis of the moving picture data, and a moving picture data storing means storing said moving picture data; and a moving picture feature data correlation measuring means calculating a correlation value between the moving picture feature data generated by said moving picture feature extraction means on the basis of the inputted moving picture data and the moving picture feature data stored in said moving picture data base, the moving picture feature data correlation measuring means retrieving the moving picture segment within the moving picture data base having a high correlation value as a candidate of similar moving picture segment.

6. A picture retrieving device as claimed in claim 5, wherein said moving picture feature data correlation measuring means divides the moving picture feature data having been generated by said moving picture feature extraction means on the basis of said inputted moving picture data, and calculates in turn a partial correlation value between a part of the moving picture feature data of the moving picture included in said moving picture data base and a moving picture feature data of each division of the divided moving picture feature data, upon which eliminating the moving picture segment included in said moving picture data base from the candidates of similar moving pictures when it has a feature data with a partial correlation value lower than a predetermined threshold value.

7. A picture retrieving device as claimed in claim 6, wherein said resized picture generating means divides a picture into blocks, and takes out from each block color information representative of each block.

8. A picture retrieving device as claimed in claim 6, wherein said resized picture generating means takes out DC components from said each block when said picture data is compressed by blocks.

9. A picture retrieving device as claimed in claim 5, wherein said moving picture feature data correlation measuring means divides the moving picture feature data having been generated by said moving picture feature extraction means in respect with said inputted moving picture data, and calculates in turn a partial correlation value between a part of the moving picture feature data of the moving picture included in said moving picture data base and a partial moving picture feature data of each division of the divided moving picture feature data, upon which eliminating the moving picture segment included in said moving picture data base from the candidates of similar moving pictures at the time when it is acknowledged that a number of partial moving picture feature data having a feature data with a partial correlation value lower than a predetermined threshold value surpasses a predetermined threshold value.

10. A picture retrieving device as claimed in claim 9, wherein said resized picture generating means divides a picture into blocks, and takes out from each block color information representative of each block.

11. A picture retrieving device as claimed in claim 9, wherein said resized picture generating means takes out DC components from said each block when said picture data is compressed by blocks.

12. A picture retrieving device as claimed in claim 5, wherein said resized picture generating means divides a picture into blocks, and takes out from each block color information representative of each block.

13. A picture retrieving device as claimed in claim 5, wherein said resized picture generating means takes out DC components from said each block when said picture data is compressed by blocks.

14. A picture feature extraction method comprising:

a feature data extracting frame selecting step for taking out some data corresponding to the entire frames or a portion of the frames from the moving picture data, selecting the data subjected to processing;

a resized picture generating step for generating a resized picture from data corresponding to each frame having been taken out;

a frequency analyzing step for executing a frequency analysis on said resized picture having been generated at said resized picture generating step;

a DC/partial AC component extracting step for taking out DC components and a part of AC components obtained as a result of the analysis at said frequency analyzing step as a frame feature data; and a moving picture feature data producing step for producing a moving picture feature data by collecting said frame feature data outputted from said DC/partial AC component extracting step.

15. A picture feature extraction method as claimed in claim 14, comprising:

a moving picture data storing step for storing said moving picture data; and a moving picture feature data storing step for storing said moving picture feature data generated for each moving picture data stored at said moving picture data storing step.

16. A picture feature extraction method as claimed in claim 15, wherein said resized picture generating step divides a still picture into blocks, and takes out from each block color data representative of each block.

17. A picture feature extraction method as claimed in claim 15, wherein in case when said picture data is compressed by blocks, said resized picture generating step takes out from each block DC components.

18. A picture feature extraction method comprising:

a picture data identifying step for identifying whether the inputted picture data is of still pictures or of moving pictures;

a still picture feature extraction step including a resized picture generating step for generating a resized picture from the picture data identified as still picture data at said picture data identifying step, a frequency analyzing step for executing a frequency analysis on said resized picture having been generated at said resized picture generating step, and a DC/partial AC component extracting step for taking out DC components and a part of AC components obtained as a result of the analysis at said frequency analyzing step as a still picture feature data; and a moving picture feature extraction step including a feature data extracting frame selecting step for taking out some data corresponding to the entire frames or a portion of the frames from the picture data identified as moving picture data at said picture data identifying step, selecting the data subjected to processing, a resized picture generating step for generating a resized picture from data corresponding to each frame having been taken out, a frequency analyzing step for executing a frequency analysis on said resized picture having been generated at said resized picture generating step, a DC/partial AC component extracting step for taking out DC components and a part of AC components obtained as a result of the analysis at said frequency analyzing step as a frame feature data, and a moving picture feature data producing step for generating a moving picture feature data by collecting said frame feature data outputted at said DC/partial AC component extracting step.

19. A picture feature extraction method as claimed in claim 18, comprising:

a picture data storing step for storing said picture data; and a picture feature data storing step using each picture data stored at said picture data storing step for storing the still picture feature data generated at said still picture feature extraction step and the moving picture feature data generated at said moving picture feature extraction step as a picture feature data.

20. A picture feature extraction method as claimed in claim 18, wherein said resized picture generating step divides a still picture into blocks, and takes out from each block color data representative of each block.

21. A picture feature extraction method as claimed in claim 18, wherein in case when said picture data is compressed by blocks, said resized picture generating step takes out from each block DC components.

22. A picture retrieving method comprising:

a moving picture feature extraction step including a feature data extracting frame selecting step for taking out some data corresponding to the entire frames or a portion of the frames from the moving picture data, selecting the data subjected to processing, a resized picture generating step for generating a resized picture from data corresponding to each frame having been taken out, a frequency analyzing step for executing a frequency analysis on said resized picture having been generated by said resized picture generating step, a DC/partial AC component extracting step for taking out DC components and a part of AC components obtained as a result of the analysis at said frequency analyzing step as a frame feature data, and a moving picture feature data producing step for producing a moving picture feature data by collecting said frame feature data outputted at said DC/partial AC component extracting step;

a moving picture feature data correlation measuring step for calculating a correlation value between the moving picture feature data of the moving picture within a moving picture data base where the moving picture feature data of the moving picture data having been previously generated at said moving picture feature extraction step is stored together with the moving picture data and the moving picture feature data generated at said moving picture feature extraction step on the basis of the inputted moving picture data; and a similar moving picture retrieving step for retrieving the moving picture segment within said moving picture data base having a high correlation value with respect to the moving picture feature data generated on the basis of the inputted moving picture data as a candidate of similar moving picture.

23. A picture retrieving method as claimed in claim 22, wherein said moving picture feature data correlation measuring step has a step of dividing the moving picture feature data having been generated by said moving picture feature extraction step on the basis of said inputted moving picture data, and a step of calculating in turn a partial correlation value between a part of the moving picture feature data of the moving picture included in said moving picture data base and a moving picture feature data of each division of the divided moving picture feature data, and said similar picture retrieving step eliminates the moving picture segment included in said moving picture data base from the candidates of similar moving pictures when it has a feature data with a partial correlation value lower than a predetermined threshold value.

24. A picture retrieving method as claimed in claim 23, wherein said second picture feature data correlation measuring step has a step of dividing the moving picture feature data having been generated by said moving picture feature extraction step on the basis of said inputted moving picture data, and a step of calculating in turn a partial correlation value between a part of the moving picture feature data of the moving picture included in said moving picture data base and a moving picture feature data of each division of the divided moving picture feature data, and said similar picture retrieving step eliminates the moving picture segment included in said moving picture data base from the candidates of similar moving pictures when it has a feature data with a partial correlation value lower than a predetermined threshold value.

25. A picture retrieving method as claimed in claim 24, wherein said resized picture generating step divides a picture into blocks, and takes out from each block color information representative of each block.

26. A picture retrieving method as claimed in claim 24, wherein said resized picture generating step takes out DC components from said each block when said picture data is compressed by blocks.

27. A picture retrieving method as claimed in claim 23, wherein said second picture feature data correlation measuring step has a step of dividing the moving picture feature data having been generated by said moving picture feature extraction step on the basis of said inputted moving picture data, and a step of calculating in turn a partial correlation value between a part of the moving picture feature data of the moving picture included in said moving picture data base and a partial moving picture feature data of each division of the divided moving picture feature data, and said similar picture retrieving step eliminates the moving picture segment included in said moving picture data base from the candidates of similar moving pictures at the time when it is acknowledged that a number of partial moving picture feature data having a feature data with a partial correlation value lower than a predetermined threshold value surpasses a predetermined threshold value.

28. A picture retrieving method as claimed in claim 27, wherein
said resized picture generating step divides a picture into blocks, and takes out from each block color information representative of each block.

29. A picture retrieving method as claimed in claim 27, wherein
said resized picture generating step takes out DC components from said each block when said picture data is compressed by blocks.

30. A picture retrieving method as claimed in claim 22, wherein
said moving picture feature data correlation measuring step has a step of dividing the moving picture feature data having been generated by said moving picture feature extraction step on the basis of said inputted moving picture data, and a step of calculating in turn a partial correlation value between a part of the moving picture feature data of the moving picture included in said moving picture data base and a partial moving picture feature data of each division of the divided moving picture feature data, and said similar picture retrieving step eliminates the moving picture segment included in said moving picture data base from the candidates of similar moving pictures at the time when it is acknowledged that a number of partial moving picture feature data having a feature data with a partial correlation value lower than a predetermined threshold value surpasses a predetermined threshold value.

31. A picture retrieving method as claimed in claim 30, wherein
said resized picture generating step divides a picture into blocks, and takes out from each block color information representative of each block.

32. A picture retrieving method as claimed in claim 30, wherein
said resized picture generating step takes out DC components from said each block when said picture data is compressed by blocks.

33. A picture retrieving method comprising:
a first picture feature data correlation measuring step for calculating a correlation value between a still picture feature data of a still picture in inputted still picture data generated by a still picture feature extraction step including a resized picture generating step for generating a resized picture from the inputted picture data identified as still picture data, a frequency analyzing step for executing a frequency analysis on said resized picture having been generated at said resized picture generating step, and a DC/partial AC component extracting step for taking out DC components and a part of AC components obtained as a result of the analysis at said frequency analyzing step as a still picture feature data and a picture feature data of a picture within a picture data base where a still picture feature data having been generated at said still picture feature extraction step on the basis of a still picture data is stored together with said still picture data;

a similar still picture retrieving step for retrieving the picture within said picture data base having a high correlation value with respect to the picture feature data generated on the basis of the inputted picture data as a candidate of similar still picture;

a second picture feature data correlation measuring step for calculating a correlation value between a moving picture feature data of a moving picture in inputted moving picture data generated by a moving picture feature extraction step including a feature data extracting frame selecting step for taking out some data corresponding to the entire frames or a portion of the frames from the picture data identified as moving picture data, selecting the data subjected to processing, a resized picture generating step for generating a resized picture from data corresponding to each frame having been taken out, a frequency analyzing step for executing a frequency analysis on said resized picture having been generated by said resized picture generating step, a DC/partial AC component extracting step for taking out DC components and a part of AC components obtained as a result of the analysis at said frequency analyzing step as a frame feature data, and a moving picture feature data producing step for generating a moving picture feature data by collecting said frame feature data outputted at said DC/partial AC component extracting step, and a picture feature data of a picture within a picture data base where a moving picture feature data having been generated at said moving picture feature extraction step on the basis of a moving picture data is stored together with said moving picture data; and a similar moving picture retrieving step for retrieving a moving picture segment within said picture data base having a high correlation value with respect to the moving picture feature data generated on the basis of the inputted moving picture data as a candidate of similar moving picture.

34. A picture retrieving method as claimed in claim 33, wherein
said resized picture generating step divides a picture into blocks, and takes out from each block color information representative of each block.

35. A picture retrieving method as claimed in claim 33, wherein
said resized picture generating step takes out DC components from said each block when said picture data is compressed by blocks.

* * * * *